Oct. 11, 1932.  M. L. FOX  1,881,450

SHOCK ABSORBER

Filed March 24, 1931  2 Sheets-Sheet 1

Inventor

Merritt L. Fox

By Popp & Powers

Attorneys

Oct. 11, 1932.  M. L. FOX  1,881,450
SHOCK ABSORBER
Filed March 24, 1931  2 Sheets-Sheet 2
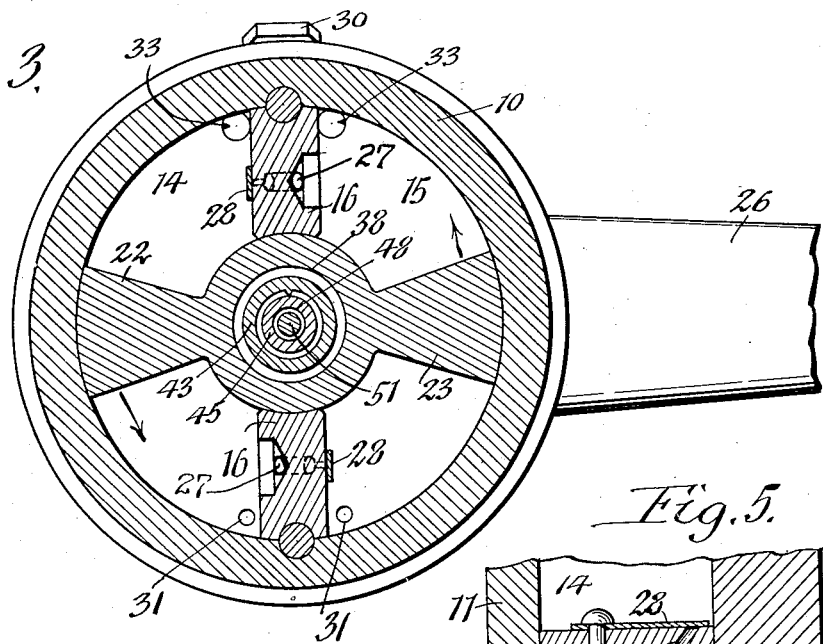
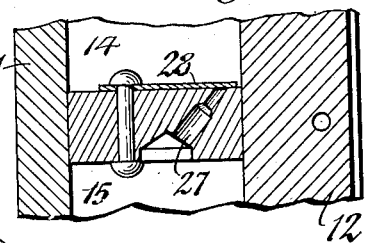
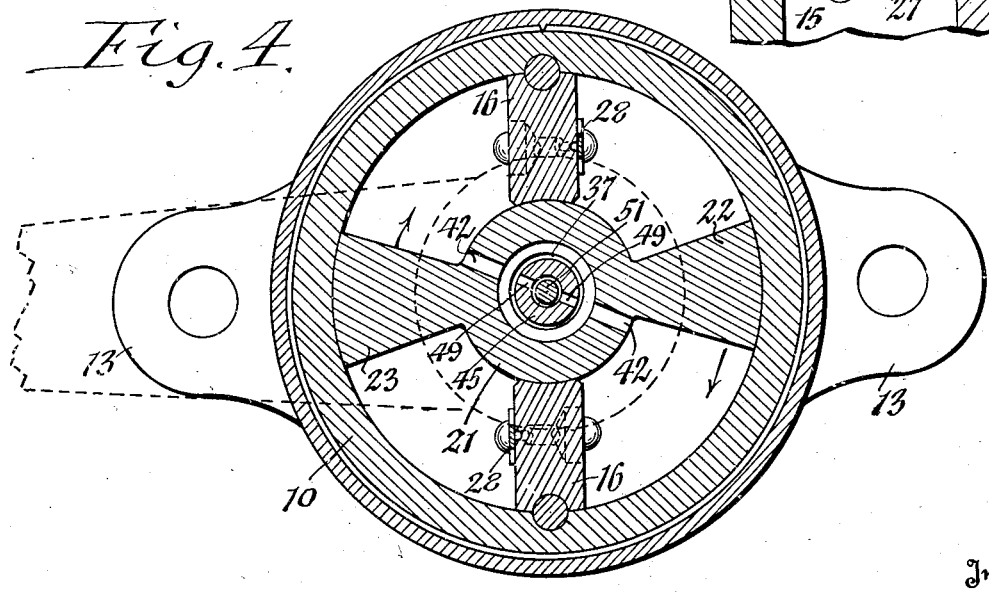

Patented Oct. 11, 1932

1,881,450

UNITED STATES PATENT OFFICE

MERRITT L. FOX, OF BUFFALO, NEW YORK, ASSIGNOR TO HOUDE ENGINEERING CORPORATION, OF BUFFALO, NEW YORK, A CORPORATION OF NEW YORK

SHOCK ABSORBER

Application filed March 24, 1931. Serial No. 524,803.

This invention relates to a hydraulic shock absorber and has for its object the provision of improved means whereby the movement of the resistance liquid which absorbs the shock is controlled automatically by means which are responsive to changes in temperature so that the liquid can flow more freely in cold weather when the liquid is thicker and less freely in warm weather when the liquid is thinner, which automatic controlling means are combined with manual adjusting means for setting the instrument according to the load which is imposed on the same, the character of the resistance liquid which is used, and other conditions.

In the accompanying drawings:

Figures 2 and 3 are vertical cross sections taken on the correspondingly numbered lines in Fig. 1, looking forwardly.

Figure 4 is a vertical cross section taken on line 4—4 Fig. 1, looking rearwardly.

Figure 5 is a fragmentary horizontal longitudinal section taken on line 5—5 Fig. 1.

In the following description similar characters of reference indicate like parts in the several figures of the drawings.

Figure 1:
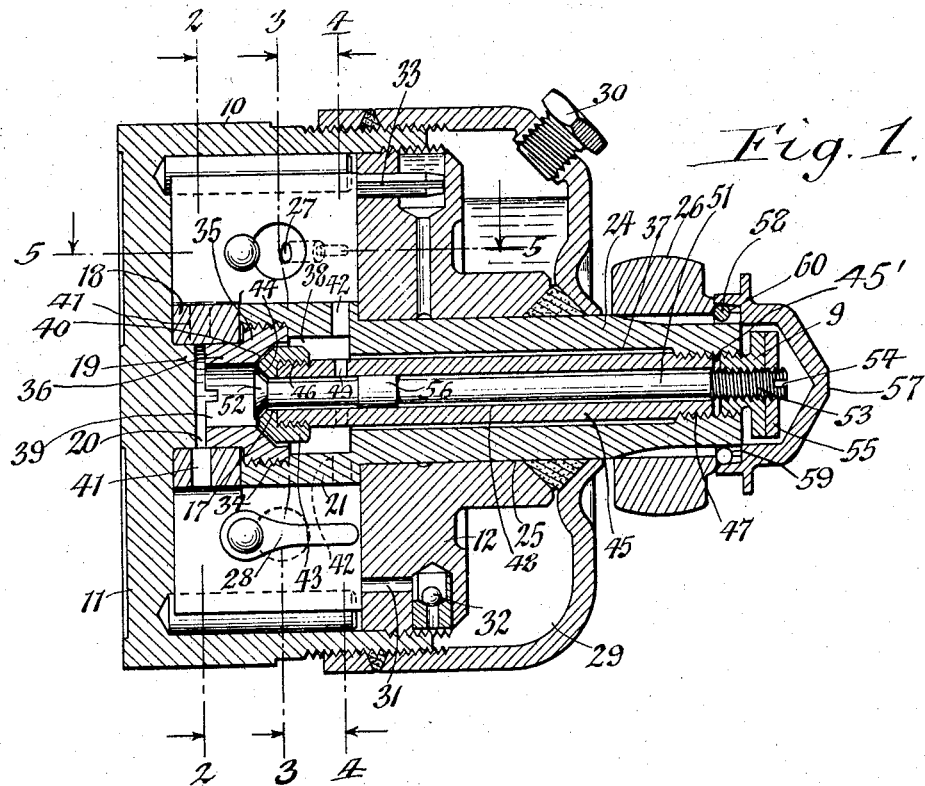
Figure 1 is a vertical longitudinal section of a shock absorber embodying my improvements.

In its general organization this shock absorber comprises a body which is adapted to be secured to one of the relatively movable members between which the shock is to be absorbed and which is provided with the working space or compartment containing the resistance liquid which absorbs the shock, and piston means which are movable back and forth in the working space and are operatively connected with the other part of the two relatively movable members between which the shock is to be absorbed.

The body of the shock absorber comprises a cylindrical outer wall 10 which is closed at its rear end by a fixed head 11 and at its front end by a removable head 12. At its opposite sides this body is provided with lugs or projections 13 whereby the same may be attached to one of the relatively movable members such for example as the frame of an automobile.

The cylindrical space between the cylindrical wall and the front and rear heads of the body contains the means whereby the shock absorbing liquid therein is subjected to pressure, which space is divided into two working chambers 14, 15 by a diametrical partition consisting preferably of upper and lower partition sections 16, 16 which are connected at their outer ends with the cylinder wall while their inner ends have their front parts separated and their rear parts connected by a centering ring 18. Within the rear part of the opening in the centering ring the same receives a centering or pilot pin 19 projecting forwardly from the central part of the rear wall of the body, while the front part of the bore of this ring forms a chamber 20 which cooperates with other passages for conducting the pressure resisting liquid in the working chambers from one side of the partition sections to the opposite sides thereof.

Between the front parts of the inner ends of the partition sections is arranged an oscillating hub 21 which connects with the inner edges of two pistons 22, 23 oscillating respectively in the working chambers 14 and 15. From the front side of the hub 21 an operating shaft 24 projects forwardly and is journaled in a bearing 25 on the central part of the front wall 12 of the body. This shaft is provided at its front end outside of the body of the instrument with an operating arm or rock lever 26 which latter is connected with a part of the automobile which moves relatively to the frame thereof, for instance an axle which is connected with said frame by means of a spring system and carries the adjacent supporting wheels.

Figure 2:
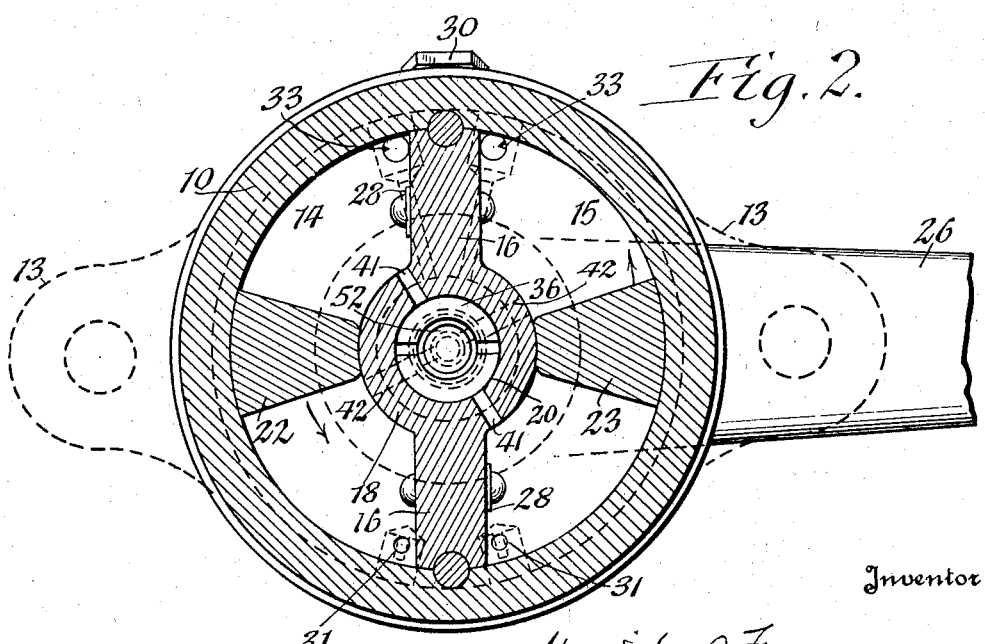

During the low pressure strokes of the pistons in the working chambers, which occurs when the frame of the automobile and the axle thereof move toward each other, the pistons move toward the low pressure ends of the working chambers, which movement is indicated by the direction of the arrows associated with these pistons in Figs. 2, 3 and 4; and during the high pressure strokes of the same which occurs during rebound of the axle and frame of the automobile from each other, these pistons move in the opposite direction. Means are provided whereby the liquid is capable of passing with comparative freedom from the low pressure end of each working chamber to the high pressure end of the other working chamber during the low pressure strokes of the pistons, but during the high pressure strokes of the same, movement of the resistance liquid from the high pressure end of each working chamber to the low pressure end of the other working chamber is checked, this being preferably accomplished by a by-pass port 27 arranged in each of the partition sections 16, 16 and a check valve 28 secured to each of the partition sections on the high pressure side of the same, and adapted to close the adjacent end of the by-pass port 27 during high pressure strokes of the piston in the respective working chamber, but to open the same during low pressure strokes of the same.

The resistance liquid is automatically supplied to the working chambers as required from a replenishing chamber 29 arranged in front of the working chambers and adapted to be filled from time to time through an opening in its top which is normally closed by a plug 30. Delivery of the resistance liquid from the replenishing chamber into one or both of the working chambers is effected in the present case by means of one or more replenishing ports 31 formed in the lower part of the front head 12 and extending from the replenishing chamber to the lower part of one or both of the working chambers, and each of these replenishing ports containing a check valve 32 which closes toward the replenishing chamber but opens toward the working chambers, as shown in Fig. 1. Any air contained in the resistance liquid is permitted to escape from the upper ends of the working chambers into the upper part of the replenishing chamber through vent ports 33 extending through the upper part of the front head 12 from the upper part of either one or both of the working chambers to the upper part of the replenishing chamber.

Relief means are provided whereby some of the resistance liquid is permitted to pass from either end of each of the working chambers to the opposite end thereof in order to avoid a dead liquid resistance to the movement of the pistons at any time and thereby insure easy riding of the automobile on which the shock absorber is installed. These relief means are so organized that when the resistance liquid becomes thicker in cold weather the conduits through which the liquid passes during this relief movement of the same will be enlarged in capacity so as to allow the liquid at this time to move more freely, while during warm weather when the liquid becomes thinner these relief conduits are reduced in cross sectional area so as to reduce the freedom of movement of the resistance liquid through the same, which variation in the capacity of these relief passages is controlled by thermostatic means which are responsive to variations in temperature.

These automatic means for varying the capacity of the liquid relief passages are also associated with manually adjustable regulating means whereby the apparatus may be adapted to properly control the cushioning or shock absorbing capacity of the instrument in accordance with the load which is imposed upon the same, the character of the resistance liquid which is used and also to meet other conditions which may be encountered in some particular installation.

In combining the improved automatic controlling means and the manually operable regulating means with the present shock absorber it is assumed that the hub of the pistons and the operating shaft connected therewith are made of steel or other metal which has a low coefficient of expansion and contraction under variations in temperature to which the same may be exposed.

The preferred means shown in the drawings for accomplishing the purposes of this invention are constructed as follows:

Secured in a recess within the rear end of the hub 21 by means of a screw joint 34 is a plug 35, which latter is provided with a rearwardly projecting reduced neck 36 projecting into the front part of the partition connecting ring 18 but terminating short of the front end of the centering pin 19 so as to form the clearance space 20 therebetween.

The hub 21, operating shaft 24 and the rear plug 36 are provided with an axial or longitudinal bore, the front part 37 of which formed partly in the piston hub and partly in the operating shaft, is of comparatively small diameter, and the central part 38 of which formed partly in the piston hub and the plug 35, is of comparatively large diameter, and the rear part 39 of which formed wholly within the rear part of the plug 35 and its neck 36, is also of comparatively small diameter. The space 38 forms a relief valve chamber.

Between the enlarged central part 38 of this bore and the reduced rear part 39 thereof this bore is provided with a relief valve seat 40 which in the present case is conical and formed on the front end of the plug 35, as shown in Fig. 1. In rear of the seat 40 the bore portion 39 communicates with the high pressure ends of the two working chambers by means of relief ports 41 formed radially in the partition ring 18 and extending from the bore 20 thereof to its periphery, as shown in Figs. 1 and 2. In front of the relief valve seat 40 the space formed by the bore within the hub and operating shaft communicates with the low pressure ends of the working chambers, this being preferably accomplished by means of two relief ports 42 formed radially in the piston hub and extending from the rear part of the enlarged bore 38 to the periphery of the piston hub, as shown in Figs. 1 and 4.

The material constituting the plug 35 and its neck 36 is also of a character which has a low coefficient of expansion and contraction and is preferably of the same material of which the hub and operating shaft are constructed—namely steel.

Within the central enlargement 38 of the relief valve chamber or bore is arranged a relief valve 43 which is preferably constructed of steel or other material which has a relatively low coefficient of expansion and contraction as the result of variations in temperature to which the same may be exposed, this valve being movable lengthwise toward and from the valve seat 40 for the purpose of varying the effective cross sectional area of the relief passage or conduit extending from one end of each of the working chambers to the opposite end of the same chamber and also to both ends of the other working chamber.

This relief valve is hollow and provided at its inner or rear end around a regulating port 17 therein with a regulating valve seat 44 which is preferably conical in form and part of the means whereby the amount of relief for the resistance liquid may be regulated manually to suit different conditions of installation.

Arranged lengthwise within the bore portions 37 of the operating shaft and 38 of the hub is a tubular valve stem 45 which is of such diameter that there is a clearance space between its periphery and the bore 37 of the shaft and bore 38 of the hub. This tubular relief valve stem 45 is connected at its rear end with the front part of the relief valve 43 by means of a screw joint 46 and at its front end this valve stem is connected with the front end of the operating shaft 24 by means of a screw joint 47.

This tubular valve stem is constructed of aluminum or any other suitable metal or material which has a higher coefficient of expansion and contraction than the metal or material of which the operating shaft 24, the hub 21 and the plug 36 are constructed, so that there is a differential in the longitudinal expansion between these relatively movable parts, namely the aluminum tubular valve stem 45 will expand and contract at a greater rate due to temperature changes than the operating shaft and the hub and plug 36 arranged at the rear end thereof.

The bore 48 of the tubular valve stem communicates at its rear end with the port in the relief valve 43 and in front of this relief valve the tubular valve stem is provided with one or more laterally extending ports 49 whereby the bore of the tubular valve stem forming a regulating valve chamber is placed in communication with the bore of the operating shaft and therefore also communicates by means of the ports 42 with the low pressure ends of the working chambers.

Upon turning the tubular valve stem in one direction or the other as by means of a suitable tool applied in the notches 45', the screw joint 47 between the same and the operating shaft permits of bringing the relief valve face of the relief valve 43 into the desired position relative to the relief valve seat 40 as may be required for effecting automatic regulation of the relief passage to suit different conditions. After the tubular valve stem has been thus adjusted the same is held in position by a clamping or locking screw sleeve 9 engaging with the internally threaded front part of the operating shaft and engaging with the front end of the tubular relief valve stem 45, as shown in Fig. 1.

Arranged lengthwise within the bore 48 of the tubular relief valve stem is a regulating valve stem 51 which is provided at its rear end with a regulating or metering valve, preferably of conical form, as shown at 52, which is movable toward and from the regulating valve seat 44 for the purpose of varying the cross sectional area or capacity of the regulating port 17 in the bore of the relief valve 43. At its front end the regulating valve stem 51 is provided with an external screw thread 53 which engages with an internal screw thread in the adjusting screw sleeve 9 whereby upon turning the regulating valve stem 51 manually the same will be moved lengthwise within the tubular valve stem, and the regulating valve 52 will be moved toward and from the regulating valve seat 44 of the relief valve 43, and thereby serve as manual means for regulating the flow of resistance liquid which can escape from one end of a working chamber to another end of a working chamber under the movement of the pistons therein.

Such turning of the regulating valve stem may be effected by inserting a screw driver or similar tool into a notch 54 at the front end of the regulating valve stem, and after such adjustment the regulating valve stem is held in position by a clamping nut 55 applied to the front end of the regulating valve stem and engaging with the front side of the clamping screw sleeve 9, as shown in Fig. 1.

In order to hold the regulating valve 52 in a central position with reference to its cooperating seat around the regulating port 17 the regulating valve stem is provided adjacent to its rear end but in front of the ports 49 of the relief valve stem with a guide collar 56 which slides in the bore of the tubular relief valve stem, as shown in Fig. 1.

In order to exclude dust and dirt from the joints at the front end of the operating shaft or the parts associated therewith and also to prevent accidental displacement of these parts or interference therewith, a protecting cap or cover 57 is applied to the front end of this shaft so as to extend over the front of the regulating valve stem and the jam nut 53 and screw sleeve 9 associated therewith, which cap may be interlocked with the front end of the operating shaft in any suitable manner, for instance by means of a split locking ring 58 interposed between the operating shaft and this cap and engaging its inner side with an annular groove 59 in the periphery of the operating shaft, and at its outer side with an internal annular groove 60 in the bore of the cap 57.

The regulating valve stem 51 is made of Invar iron or other metal or material which is practically insensible to temperature changes and will not appreciably expand when the temperature rises or shorten when the temperature is lowered.

In assembling the valve mechanism of this instrument the operating shaft 24 is heated to approximately 150° F. which is approximately the maximum temperature attained by this shock absorber when in use, and the aluminum tubular relief valve stem 45 is so adjusted that the relief valve 43 at the rear end thereof engages with the seat 40 on the plug at the rear end of the hub, after which the tubular valve stem is prevented from turning by the locking sleeve 9 and also by peening a small portion of the screw joint between this sleeve and the operating shaft so as to prevent these parts from turning relatively to each other.

The shaft 24 is then allowed to cool with the remaining parts of the instrument with which the same is assembled in the completed shock absorber whereby the relief valve 43 will be disengaged to some extent from the relief valve seat 40 on the plug 35 and open up communication between the high and low pressure ends of the working chambers.

The final setting of the shock absorber is now effected in order to give the same the required torque resistance to the loads which are imposed upon the same and this is accomplished by adjusting the central regulating valve stem 51 of material which is non-responsive to temperature changes, so that the regulating valve at the inner or rear end of this valve stem is arranged at the required distance from the regulating valve seat 44 to meet these conditions.

As a result of this construction and operation of the apparatus the lowering of the temperature to which the instrument is exposed will cause the operating shaft, piston hub and the front plug 35 which are made of steel to shorten and at the same time the tubular relief valve stem 45 will also shorten, but owing to the differential in the coefficient of expansion and contraction between these metals, the tubular relief valve stem will contract to a greater extent and thereby increase the cross sectional area of the gap between the relief valve 43 and the seat 40 on the plug of the piston hub, whereby greater freedom of movement of the resistance liquid will be permitted in its passage from one end of each working chamber to the opposite end of the same and to the other working chamber. At the same time the relief valve 43 will also be moved away from the regulating valve 52 which remains practically stationary, thereby also increasing the gap between the regulating valve and the relief valve and thus increasing the area of the passage-way connecting the several ends of the working chambers so as to permit greater freedom of movement of the resistance liquid into and out of the respective ends of these chambers.

When the temperature to which the instrument is exposed increases, the operating shaft, piston hub and the plug of the latter expand and the tubular relief valve stem also expands lengthwise but at a greater extent than the expansion of the operating shaft, piston hub and its relief valve seat mounted thereon by means of the rear plug 35, whereby the cross sectional area of the gap between the relief valve 43 and the seat 40 is reduced and the freedom of flow of the resistance liquid to and from the ends of the working chambers is reduced, this reduction in the freedom of flow of the resistance liquid being at this time further decreased due to the movement of the relief valve 43 toward the regulating valve 52.

By means of these thermo-responsive devices which effect an automatic regulation of the relief conduits in response to temperature variations and the manually operated means which permit of varying the freedom of flow of the resistance liquid in accordance with the special conditions, any variation in the limpidity of the resistance liquid as it becomes thicker in cold weather and thinner in warm weather is compensated for. The shock absorber is also adaptable for carrying variable loads which may be imposed upon the same thereby causing the shock absorber to constantly operate uniformly, and thereby provide easy and confortable riding for passengers as well as enabling merchandise to be carried with greater safety against jarring or breakage.

I claim as my invention:

1. A hydraulic shock absorber comprising a working chamber, a piston movable back and forth in said chamber, a conduit member having a relief passage communicating with said working chamber on opposite sides of said piston and provided with a relief valve seat, a hollow relief valve movable toward and from said relief valve seat and containing a regulating passage communicating with said relief passage and having a regulating valve seat, a main supporting member which is connected with said conduit member and expands and contracts in response to temperature changes, an auxiliary supporting member which is connected with said main supporting member and with said relief valve and expands and contracts in response to temperature changes at a different rate from said main supporting member, a valve movable toward and from said regulating valve seat, and a stem of material practically insensible to temperature changes connecting said regulating valve with said auxiliary supporting member.

2. A hydraulic shock absorber comprising a body having a working chamber, a piston oscillating in said chamber; a hub connected with said piston; an operating shaft connected with said hub, said hub and shaft having a longitudinal bore the rear part of which communicates through a port with said chamber and is provided with a relief valve seat; a hollow relief valve movable toward and from said relief valve seat, a tubular relief valve stem connected at one end with said relief valve and at its opposite end with said operating shaft and having its interior communicating with said hollow relief valve and also with the bore of said hub and operating shaft, said relief valve having a regulating valve seat, a regulating valve movable toward and from said regulating valve seat, and a regulating valve stem arranged within the tubular relief valve stem and connected at one end with said regulating valve and at its opposite end with said relief valve stem.

3. A hydraulic shock absorber comprising a body having a working chamber, a piston oscillating in said chamber; a hub connected with said piston; an operating shaft connected with said hub, said hub and shaft having a longitudinal bore the rear part of which communicates through a port with said chamber and is provided with a relief valve seat; a hollow relief valve movable toward and from said relief valve seat, a tubular relief valve stem connected at one end with said relief valve and at its opposite end with said operating shaft and having its interior communicating with said hollow relief valve and also with the bore of said hub and operating shaft, said relief valve having a regulating valve seat, a regulating valve movable toward and from said regulating valve seat, and a regulating valve stem arranged within the tubular relief valve stem and connected at one end with said regulating valve and at its opposite end with said relief valve stem, said operating shaft and relief valve stem being constructed of metal of different coefficients of expansion and contraction in response to temperature changes.

4. A hydraulic shock absorber comprising a body having a working chamber, a piston oscillating in said chamber; a hub connected with said piston; an operating shaft connected with said hub, said hub and shaft having a longitudinal bore the rear part of which communicates through a port with said chamber and is provided with a relief valve seat; a hollow relief valve movable toward and from said relief valve seat, a tubular relief valve stem connected at one end with said relief valve and at its opposite end with said operating shaft and having its interior communicating with said hollow relief valve and also with the bore of said hub and operating shaft, said relief valve having a regulating valve seat, a regulating valve movable toward and from said regulating valve seat, and a regulating valve stem arranged within the tubular relief valve stem and connected at one end with said regulating valve and at its opposite end with said relief valve stem, said operating shaft and relief valve stem being constructed of metal of different coefficients of expansion and contraction in response to temperature changes and said relief valve stem being constructed of metal practically insensible to temperature changes.

5. A hydraulic shock absorber comprising a body having a working chamber, a piston oscillating in said chamber, a hub connected with said piston, an operating shaft connected with the front end of said hub, a plug connected with the rear end of said hub, said hub, shaft and plug having a longitudinal bore the rear part of which forms a conduit which communicates with the working chamber on opposite sides of the piston therein and that part of said bore between the hub and said plug being enlarged to form a valve chamber, and said plug having a relief valve seat facing into said chamber, a hollow relief valve arranged in said valve chamber and movable toward and from said relief valve seat and having a regulating valve seat, a tubular relief valve stem arranged within the bore of said hub and shaft and having its rear end connected with said relief valve and its front end connected with said shaft and having its interior communicating with the bore of said hub and shaft; a regulating valve movable toward and from said regulating valve seat; and a regulating valve stem arranged within the tubular relief valve stem and connected at its rear end with said regulating valve and adjustably connected at its front end with said tubular relief valve stem.

6. A hydraulic shock absorber comprising a body having a working chamber, a piston oscillating in said chamber, a hub connected with said piston, an operating shaft connected with the front end of said hub, a plug connected with the rear end of said hub, said hub, shaft and plug having a longitudinal bore the rear part of which forms a conduit which communicates with the working chamber on opposite sides of the piston therein and that part of said bore between the hub and said plug being enlarged to form a valve chamber and said plug having a relief valve seat facing into said chamber, a hollow relief valve arranged in said valve chamber and movable toward and from said relief valve seat and having a regulating valve seat, a tubular relief valve stem arranged within the bore of said hub and shaft and having its rear end connected with said relief valve and its front end connected with said shaft and having its interior communicating with the bore of said hub and shaft, a screw sleeve secured in the front end of said shaft and engaging with the front end of said tubular relief valve stem and having an internal screw thread, a regulating valve movable toward and from the regulating valve seat, and a regulating valve steam arranged in said relief valve stem and connected at its rear end with said regulating valve and having a screw threaded front end which engages with the internal thread of said screw sleeve.

7. A hydraulic shock absorber comprising a cylindrical body, partition sections arranged within the body dividing the same into semi-cylindrical working chambers, a ring connecting the inner ends of said partition sections, pistons oscillating in said working chambers, a hub arranged between said partition sections and connecting said pistons, an operating shaft extending forwardly from said hub, a plug secured to the rear end of said hub, said hub, shaft and plug having an axial bore the rear part of which forms a relief valve chamber which has a relief valve seat on the front side of said plug; said hub having ports leading from the bore thereof into said working chambers, the rear end of the bore in said plug opening into said ring, said ring having ports leading from its bore to said working chambers, a hollow relief valve arranged in said relief valve chamber and movable toward and from said relief valve seat and having a regulating valve seat, a tubular relief valve stem arranged in the bore of said hub and shaft and connected at its rear end with said relief valve and at its front end with said shaft, a regulating valve movable toward and from said regulating valve seat, and a regulating valve seat arranged within the tubular valve stem and adjustably connecting said regulating valve with said relief valve stem.

8. A valve mechanism for hydraulic shock absorbers comprising an outer member, an intermediate member and an inner member, said members being concentrically arranged and secured together at their outer ends, said outer member at its inner end having a valve chamber provided with an outlet and an inlet and having a valve seat, a relief valve at the inner end of said intermediate member for cooperating with said valve seat, said relief valve having a valve seat, a valve at the inner end of said inner member for cooperating with said relief valve seat, said intermediate member providing an auxiliary path between said inlet and outlet and said auxiliary path being controlled by the valve on said inner member, said members being of material of different coefficients of expansion whereby under temperature changes said valve will be operated to cooperate to control the flow through said valve chamber between said inlet and outlet.

9. A valve mechanism comprising an outer member, an intermediate member and an inner member, said outer member at its inner end having a valve chamber provided with inlet and outlet and having a valve seat, a relief valve at the inner end of said intermediate member for cooperating with said valve seat, said relief valve having a valve seat and a valve at the inner end of said inner member for cooperating with said relief valve seat, an auxiliary path between said inlet and outlet controlled by said valve on said inner member, said members being adjustably secured together at their outer ends and being of material having different coefficients of expansion whereby to respond to temperature changes for cooperation of said valve and valve seat to control the flow between said inlet and outlet.

In testimony whereof I hereby affix my signature.

MERRITT L. FOX.